US006413336B1

(12) United States Patent
Likness

(10) Patent No.: US 6,413,336 B1
(45) Date of Patent: Jul. 2, 2002

(54) METHOD AND APPARATUS FOR CREATING AND APPLYING A DECORATIVE DIMENSIONAL FIGURE OR DESIGN TO A SURFACE

(76) Inventor: Eric Q. Likness, 3211 S. 15th St., Milwaukee, WI (US) 53215

( * ) Notice: Subject to any disclaimer, the term of this patent is extended or adjusted under 35 U.S.C. 154(b) by 0 days.

(21) Appl. No.: 09/570,626

(22) Filed: May 15, 2000

(51) Int. Cl.[7] .......................... B05C 11/00; B44C 5/04; B32B 33/00

(52) U.S. Cl. ......................... 156/71; 118/505; 156/247; 264/33; 264/34; 427/403

(58) Field of Search .......................... 156/63, 71, 311.2, 156/247; 52/311.2; 118/211, 505; 264/213, 33, 34, 254–256, 284, 293; 249/1, 10, 13–50, 105–110, 187.1–204; 427/403

(56) References Cited

U.S. PATENT DOCUMENTS 333,459 A 12/1885 Gibson
2,595,142 A * 4/1952 Herck ......................... 264/31
4,647,000 A * 3/1987 Osada ......................... 249/83
5,401,231 A * 3/1995 Hebert ........................ 492/37
5,676,999 A 10/1997 Silva
5,771,525 A * 6/1998 Fulcher et al. ............. 15/244.1

* cited by examiner

*Primary Examiner*—Richard Crispino
*Assistant Examiner*—Sing Po Chan
(74) *Attorney, Agent, or Firm*—Joseph S. Heino

(57) ABSTRACT

A method and apparatus utilizing a plurality of complimentary flat planar surfaces having apertures forming a figure or object. The method of the present invention comprises the steps of positioning a planar body on a planar surface, applying drywall compound so as to fill the aperture or apertures, allowing the compound to dry partially, removing the planar body, replacing the planar body over the drywall mold, positioning a second planar body and removably attaching the second planar body, spreading drywall compound over the apertures in the second planar body, allowing the compond to dry and removing the first and second planar bodies. The apparatus of the present invention is the equipment required to carry out this method.

7 Claims, 2 Drawing Sheets

METHOD AND APPARATUS FOR CREATING AND APPLYING A DECORATIVE DIMENSIONAL FIGURE OR DESIGN TO A SURFACE

FIELD OF THE INVENTION

This invention relates generally to methods and devices for applying plaster or drywall compounds to vertical or horizontal planar surfaces. More specifically, it relates to a method and an apparatus for creating and applying a decorative dimensional figure or design to a planar vertical or horizontal surface.

BACKGROUND OF THE INVENTION

From the earliest dwellings in which primitive animal paintings decorated cave walls to the elegant wood trimmings and fascia of modern homes, mankind has long attempted to surround itself with decorative scenes and objects of everyday life. Modern interior decorating has tended to gravitate towards wall texturing, wall papering and wall stenciling in order to accomplish this objective. While wall texturing is an elegant form of wall decorating, customized wallpapering and stenciling is really the only available way of adding some theme specific or customized form of expression to a home or office. In the experience of this inventor, however, wallpapering and wall stenciling lack. the elegance of a dimensional surface.

SUMMARY OF THE INVENTION

It is, therefore, a principal object of this invention to provide a new, useful and uncomplicated method and apparatus for applying a dimensional design or figure to a wall or ceiling. It is a further object of this invention to provide such a method and apparatus which requires only a minimal number of elements and which requires only a minimal number of steps to utilize. It is yet another object of this invention to provide such a method and apparatus which is easily used by plasterers and drywallers on virtually any planar surface to create a dimensional design or figure. It is still another object of this invention to provide such a method and apparatus which provides for a virtually unlimited number of dimensional designs and figures. It is still another object of this invention to provide such a method and apparatus whereby the apparatus can be easily cleaned, which can be used and reused and which can be duplicated.

The present invention has obtained these objects. It provides for a method and apparatus which utilizes at least two flat planar bodies for overlaying a planar surface such as a vertical wall. Each planar body has a number of openings defined within it. These openings visually form a figure or an object. The positioning of such openings in one body compliments and corresponds to openings in the other body. When the first planar body is positioned adjacent a planar surface, and then removably attached to it, a quantity of drywall compound can be applied over the body, thus filling the openings. This can be done several different ways—with a broad knife and mud pan, with a hawk and trowel, and even by use of spray equipment. When the drywall compound is set, but not completely dried, the first planar body is removed and the drywall compound is left to dry. The first planar body is then cleaned and removably affixed over the dried drywall compound layer. The second planar body is then positioned adjacent the first planar body and removably attached to the first planar body. Proper alignment is made and a second amount of drywall compound is applied over the second planar body, thus filling its openings. When this second drywall layer is firm, but not completely dried, the second planar body is removed and the resulting figure is left to dry. As either or both drywall layers are applied, it is possible for each to be textured by means of a brush or comb to give the object further character or realistic appearance. This stacking of planar bodies thus provides depth and the appearance of dimensionality. Later dry sanding may be done if such is desired or required to perfect the form of the dimensional object or design.

DETAILED DESCRIPTION

Figure 1:
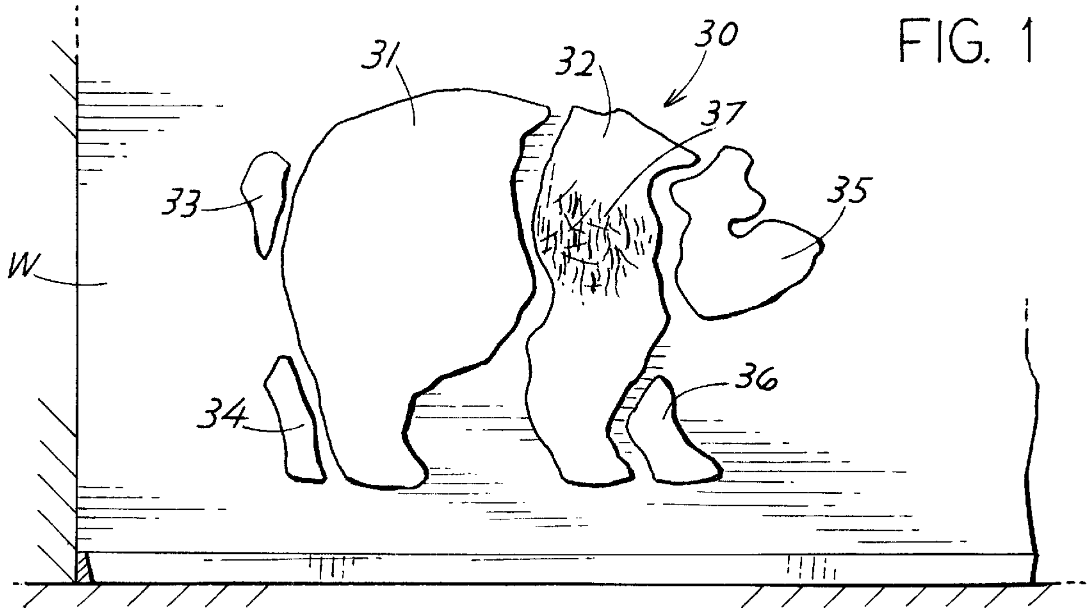
FIG. 1 is a front elevational view of a wall upon which a figure, as the abstract form of a bear in this embodiment, has been created by using the method and apparatus of the present invention.
Figure 4:
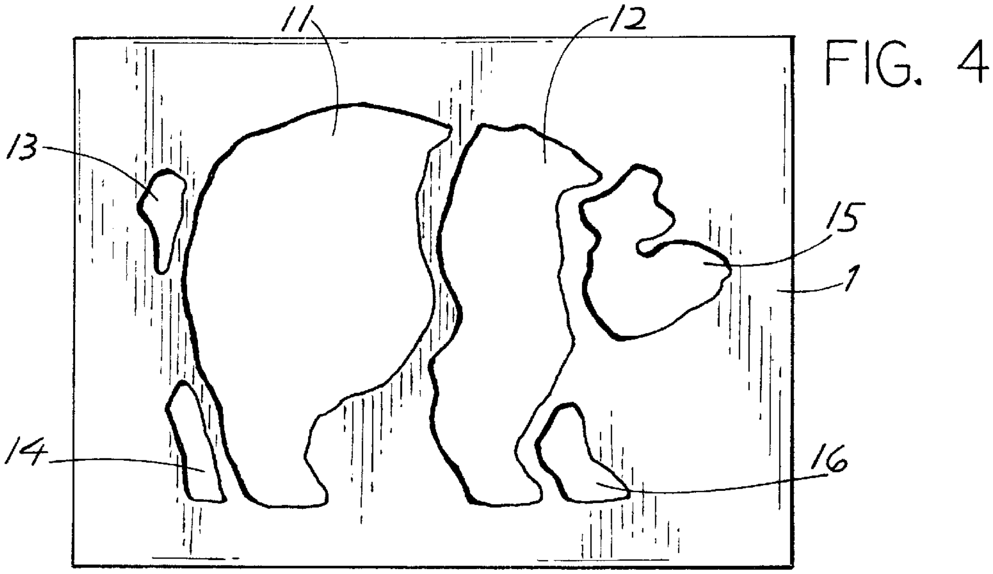
FIG. 4 is a front elevational view of a first dimensional-creating apparatus constructed in accordance with the present invention.
Figure 5:
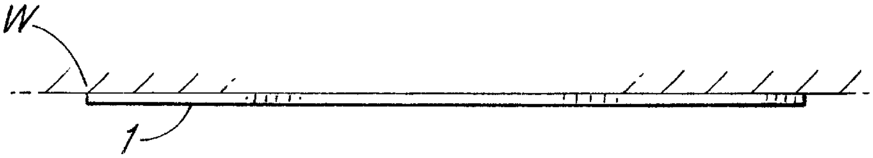
FIG. 5 is a top plan view of the dimensional-creating apparatus shown in FIG. 4.

Referring now to the drawings in detail, FIG. 1 shows a dimensional figure of a bear which has been created in accordance with the method and apparatus of the present invention. As shown in FIG. 4, the apparatus of the present invention includes a first planar body 1. The first planar body 1 is constructed of a plastic material which is somewhat rigid and cleanable. In the experience of this inventor, the planar body 1 may come in various sizes and shapes and is typically about 1/16th of an inch thick. See FIG. 5. The design or figure depicted on the first planar body 1 can be of anything which suits the fancy of the homeowner. In the embodiment to depicted, the abstract form of a bear, generally identified 30, is shown. This form is identifiable by a plurality of openings which depict the bear's hindquarter 11, shoulder 12, head 15, tail 13 and legs 14, 16, respectively. Although the abstract shape of a bear is shown, it is to be understood that any shape or design could be adapted for the purposes of the method and apparatus of the present invention.

Figure 6:
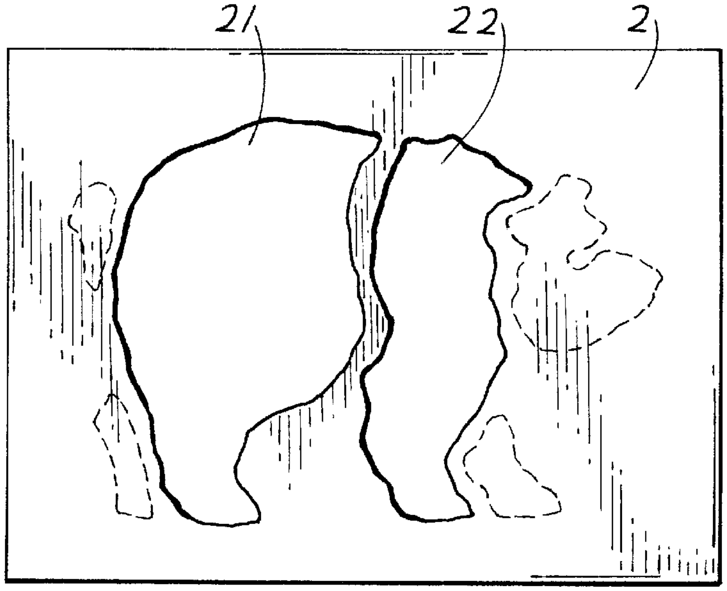
FIG. 6 is a front elevational view of a second dimensional-creating apparatus constructed in accordance with the present invention and showing it overlaying the first dimensional-creating apparatus shown in FIGS. 4 and 5.
Figure 7:
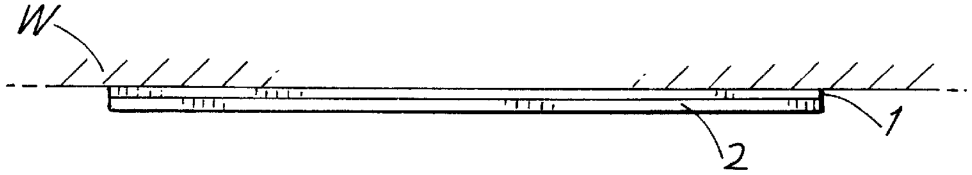
FIG. 7 is a top plan view of the first dimensional-creating apparatus and the second dimensional-creating apparatus which overlays it.

In the preferred embodiment, a second planar body 2 is provided which has openings defined within it which correspond to the bear's hindquarter 21 and shoulder 22. See FIG. 6. The openings contained within the second planar body 2 correspond to like openings in the first planar body 1. For example, the shoulder opening 22 of the second planar body 2 corresponds, and assumes the identical shape of, the shoulder opening 12 of the first planar body. The same is true of the hindquarter openings 11, 21 of the first and second planar bodies 1, 2, respectively. As shown in FIG. 7, the first planar body 1 of the apparatus of the present invention is functionally adapted to be removably attached to a wall W, or other planar surface. The first planar body 1 is then functionally adapted to be overlaid by the second planar body 2.

In application, the first planar body 1 is positioned adjacent a planar surface, such as a vertical wall W, and is then removably attached to it by use of an adhesive. This inventor has found that stencil adhesive or contact cement work quite well. A strong adhesive should be avoided and, in the case of new drywall applications, the drywall should be primed. In the case where the drywaller will be spraying the drywall compound over the first planar body, the sprayer should be very familiar with his or her equipment and the pressures involved so as to prevent blowing the first planar body 1 away from the wall W. With the first planar body 1 firmly in place, a quantity of drywall compound or mud can be applied over the first planar body 1, thus filling the openings 11, 12, 13, 14, 15, 16 defined within it. This can be done several different ways—with a broad knife and mud pan, with a hawk and trowel, and even by use of spray equipment. When applying the drywall compound, the openings 11, 12, 13, 14, 15, 16 of the first planar body 1 should be overfilled using a broad knife or trowel which is large enough to cover the entire width of the body 1. Excess compound is removed by pulling the knife or trowel across the first planar body tightly. This will leave behind a totally smooth appearance to the compound in the body 1. Larger figures, using larger planar bodies 1, 2 may require the use of a plasterer's rod, darby or other form of straight edge. The drywall compound should be left to set but not completely dry. When the drywall compound is set, but not completely dried, the first planar body 1 is removed and the drywall compound is then left to dry. The first planar body 1 is then cleaned and later removably affixed over the dried drywall compound layer a second time.

In the experience of this inventor, the drywall compound to be applied should be mixed to a creamy lump-free consistency. It should be stiff but still easily workable. Drywall compound which is mixed too thin will result in sagging or drooping in the compound, thus defeating the ability to form a quality dimensional figure. And this is true for the initial layer of drywall compound as well as for subsequent layers as further described below.

Figure 2:
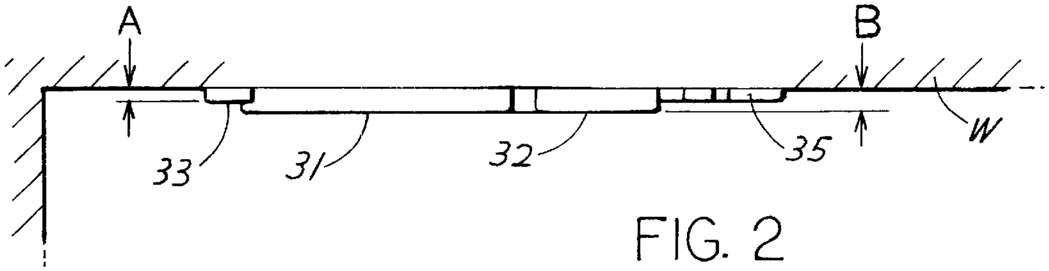
FIG. 2 is a top plan view of the dimensional figure shown in FIG. 1.
Figure 3:
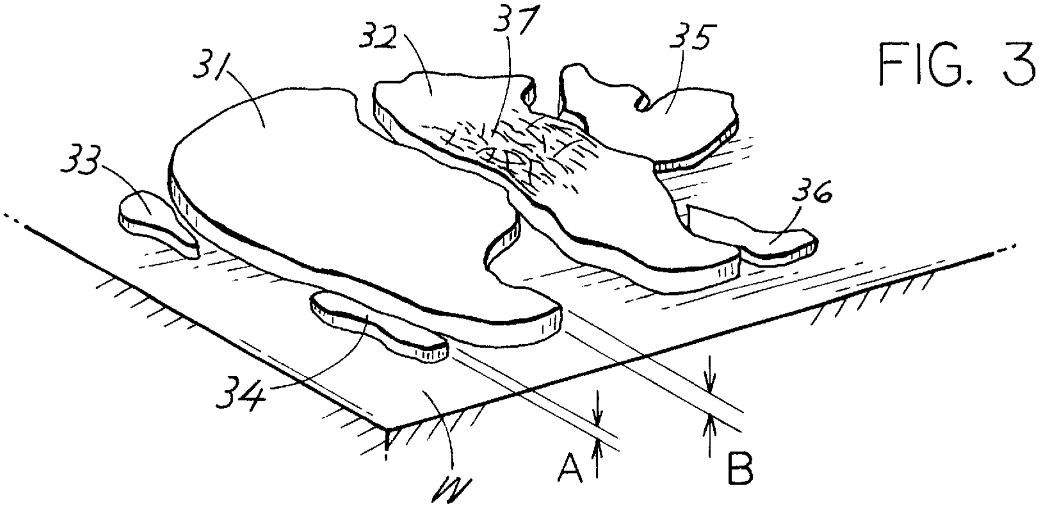
FIG. 3 is a lower left hand and comer perspective view of the dimensional figure shown in FIGS. 1 and 2.

The second planar body 2 is then positioned adjacent the first planar body 1 and is removably attached to the first planar body 1 in the manner mentioned earlier for attaching the first planar body to the wall W. Proper alignment is made between the first and second planar bodies 1, 2 and a second amount of drywall compound is applied over the second planar body 2, thus filling its openings 21, 22. See FIG. 6. When this second layer of drywall is firm, but not completely dried, the second planar body 2 is likewise removed with the first planar body 1 and the resulting figure is left to dry. Later sanding may be done to smooth edges. See FIGS. 1 through 3. As shown, the resulting figure of the bear has a dimensional quality to it. The shoulder 32 and hindquarter 31 portions of the bear stand out from the head 35, tail 33 and legs 34, 36 portions. See FIGS. 1 and 3. At this point, both the first and second planar bodies 1, 2 should be cleaned for future use.

As either or both drywall layers are applied, it is possible for each to be textured by means of a brush or comb to give the object further character or realistic appearance. Texture may also be created by using sponges, rollers, etc. In the application of texture, the user has great latitude and artistic license as to what tools he or she may use to obtain a desired effect. For example, when attempting to imitate fur 37 at the shoulder 32 of the bear, this inventor would use a series of different coarseness of combs and brushes (not shown). Finer hair or fur is best duplicated by use of a paint brush or other form of fine hair brush. Coarser hair is mimicked by using coarser brushes or combs. Other patterns can be produced by cutting into the second layer of compound while it is still workable using a coarse brush or comb and leaving other areas untouched. The next finer comb or brush is then used, being careful to not disturb those portions already textured. The finest brush is then used to blend these two previously texture areas together. In this fashion, a truly unique, if not truly artistic, dimensional figure is created, no two of which are ever identical. Multiple textures may also be incorporated into the same figure or design by adhering the first planar body 1 to the wall W, covering the areas that are to have one type of texture and filling in the open areas with one form of texture. The first planar body 1 is then removed, cleaned and reapplied after the first compound layer dries. The first planar body 1 is reattached, the textured areas are covered and the open areas are filled and textured with a second and different texture. The ways and means of texturing are as limitless as the sizes and shapes of the figures which may be created by using the method and apparatus of the present invention.

From the foregoing, it will be apparent that there has been provided a new, useful and uncomplicated method and apparatus for applying a dimensional design or figure to a wall or ceiling; which requires only a minimal number of elements and which requires only a minimal number of steps to utilize; which is easily used by plasterers and drywallers on virtually any planar surface to create a dimensional design or figure; which provides for a virtually unlimited number of dimensional designs and figures; and which can be used and reused.

The principles of this invention having been fully explained in connection with the foregoing, I hereby claim as my invention:

1. A method for creating and applying a decorative dimensional figure or design to a planar surface which comprises the steps of providing a first planar body, said planar body having openings defined in it which openings form part of a design or figure, removably attaching the first planar body to said planar surface, applying a drywall compound to said first planar body whereby the openings defined within said body are filled with compound, allowing the compound to set, removing the first planar body from said planar surface, reapplying said first planar body to said planar surface with the openings being in alignment with said figure or design, providing a second planar body, said planar body having openings defined in it which openings form part of a design or figure and which compliment the openings defined within said first planar body, removably attaching the second planar body to said first planar body, applying a drywall compound to said second planar body whereby the openings defined within said body are filled with compound, allowing the compound to set, and removing said first and second planar bodies from said planar surface whereby a dimensional figure or design comprised of compound remains affixed to said planar surface.

2. The method of claim 1 wherein the openings of said first planar body compliment the openings of said second planar body whereby a dimensional figure is formed thereby.

3. The method of claim 2 wherein the openings of said first planar body form a design or figure and the openings of said second planar body form a portion of a design or figure.

4. The method of claim 3 including the step of texturing the drywall compound prior to said drywall setting step.

5. The method of claim 4 wherein said planar body providing steps include providing a first planar body and a second planar body which are constructed of a plastic material.

6. An apparatus for applying a decorative dimensional figure or design to a planar surface comprising a plurality of planar bodies, each of said bodies having apertures defined within them that collectively form a design or figure, means for removably attaching the plurality of planar bodies to each other, wherein the apertures of at least one planar body compliment the apertures of at least one other planar body whereby a dimensional figure can be formed thereby and wherein the planar bodies cooperate to admit a compound such that when the compound is allowed to dry the compound provides a dimensional surface corresponding to each of the planar bodies used to produce the design or figure, and means for applying a drywall compound to the apertures within the plurality of planar bodies whereby the apertures defined within said bodies are filled with compound and a dimensional design or figure comprised of compound remains affixed to said planar surface.

7. The apparatus of claim 6 wherein the openings of said at least one planar body form a design or figure and the openings of said at least one other planar body form a portion of a design or figure.

* * * * *